US007817310B2

(12) United States Patent
Hui

(10) Patent No.: US 7,817,310 B2
(45) Date of Patent: Oct. 19, 2010

(54) SHEET-SIZE DETECTING MECHANISM FOR IMAGE SCANNING APPARATUS

(75) Inventor: Lien Szu Hui, Hsinchu (TW)

(73) Assignee: Avision Inc. (TW)

( * ) Notice: Subject to any disclaimer, the term of this patent is extended or adjusted under 35 U.S.C. 154(b) by 985 days.

(21) Appl. No.: 11/634,418

(22) Filed: Dec. 7, 2006

(65) Prior Publication Data

US 2007/0122219 A1 May 31, 2007

(30) Foreign Application Priority Data

Nov. 30, 2005 (TW) .............................. 94142015 A

(51) Int. Cl.
*H04N 1/40* (2006.01)
*H04N 1/04* (2006.01)
*G03G 15/00* (2006.01)

(52) U.S. Cl. ........................ 358/449; 358/496; 399/370

(58) Field of Classification Search ................. 358/449, 358/496; 399/370

See application file for complete search history.

(56) References Cited

U.S. PATENT DOCUMENTS 5,699,165 A * 12/1997 Suzuki et al. ............... 358/296
6,075,623 A * 6/2000 Yun ........................... 358/486
6,839,155 B2 * 1/2005 Spencer ...................... 358/488
7,468,818 B2 * 12/2008 Suzuki ....................... 358/498
7,558,524 B2 * 7/2009 Ooshima et al. ............ 399/370

* cited by examiner

*Primary Examiner*—Twyler L Haskins
*Assistant Examiner*—Fred Guillermety

(57) ABSTRACT

A sheet-size detecting mechanism for an image scanning apparatus detects the width of a sheet before a complete image of a sheet is acquired by the means of varying optical paths and obtaining a partial image of the sheet in advance so as to judge a width of the sheet. The mechanism includes a light source, a reflecting device having at least one reflecting mirror, a path-routing device, a photosensor, and a detecting position defined on a sheet transporting path of the sheet. The path-routing device may be rotatable, movable or fixed and reflects light rays from the detecting position and a scanning position. The path-routing device changes the optical path so that the partial image of the sheet at the detecting position may be acquired and the width of the sheet may be judged precisely. In addition, the manufacturing cost can be decreased because the sheet-size detecting mechanism and an image scan mechanism may have shared components.

12 Claims, 5 Drawing Sheets

SHEET-SIZE DETECTING MECHANISM FOR IMAGE SCANNING APPARATUS

BACKGROUND OF THE INVENTION

1. Field of the Invention

The invention relates to a sheet-size detecting mechanism installed in an image scanning apparatus, such as a scanner, a copier or a multi-function peripheral. The sheet-size detecting mechanism automatically detects a width of a sheet.

2. Prior Art

A conventional scanner has to be connected to a computer, so the user can select a desired scan area through a pre-scan function. In addition, the scanned image may be automatically cropped using the image processing software. Because the operation processes have included the step of selecting an image area, the scanner does not have to perform the sheet detection in advance. In addition, the typical A4-size automatic sheet feeding mechanism has no such function to detect the size of the sheet. This is because that the A4-size sheet is the most widely used sheet.

An electromechanical mechanism may be adopted and purported for sheet-size detection, which may include multiple micro switches, which are disposed on a sheet input tray and correspond to the sheets of different specifications. For example, eight micro switches are needed if the sheet input tray could accommodate sheets of eight different specifications. Because the space of the sheet input tray is limited, it is impossible to install too many micro switches. In addition, if the sheet size does not fall within the predefined range, the mechanism cannot be used to get the precise result. Thus, it is impossible to distinguish too many paper widths according to such a design.

In another resistive sheet-size detecting mechanism, a variable resistor is disposed between a width adjusting plate of the sheet input tray and a circuit board. Various resistance values corresponding to different sheet widths are generated when the width adjusting plate is moved. However, the continuously worn resistor has a short lifetime, and the consistency of the values of resistance tends to be unstable, thus influencing the precision of the sheet-size detection.

In addition, the conventional sheet-size detecting mechanism may be a mechanism utilizing capacitors or inductors, which changes their electric characteristics, such as capacitance or inductance, to get the corresponding sheet width. However, either one of them also has the drawbacks the same as the resistive mechanism.

In addition to the practices mentioned hereinabove, the application of sheet-size detection is important in the fields of the multi-function peripheral and the digital copier in particular. According to the development of these fields, the factor "speed" is usually an important indicator of determining the competition ability. Thus, it is a great advantage to the increase of speed if the processing speed can be increased in every aspect of the scanning procedure or if some preparation can be made in advance.

SUMMARY OF THE INVENTION

It is therefore an object of the invention to provide an optical sheet-size detecting mechanism having no additional sensor or micro switch, so as to decrease the manufacturing cost. Also, the sheet-size detecting mechanism has no element wear and is free from the problem with lifetime.

According to the above-mentioned object, the invention is capable of varying the optical path for image scanning. More particularly, before the complete scanned image of a document is obtained, the optical path is first changed to get the partial image of the sheet in advance, and the width of the sheet is judged according to the partial image. Then, the optical path returns to the predetermined optical path such that the sheet may be scanned when it is transported to the scanning position.

The sheet-size detecting mechanism according to the invention includes a light source, a reflecting device having at least one reflecting mirror, a path-routing device and a photosensor. The path-routing device may be rotatable or movable. The optical path of an optical signal for a scan line may be changed when the path-routing device is rotated or moved, so that the photosensor receives the scanned image of the scan line before the sheet reaches the scanning position and the width of the sheet can be judged.

Also, the path-routing device may be stationary. When the sheet reaches the detecting position, the photosensor can obtain the scanned image through the path-routing device so that the width of the sheet may be judged. When the sheet reaches the scanning position, the photosensor can obtain the scanned image with the optical signal not intercepted by the path-routing device.

According to the invention in the applications of the multi-function peripheral and the digital copier, for example, the size of the document can be obtained before the document reaches the scan window where the document is scanned by an optical module of the multi-function peripheral or the digital copier, and the system can prepare in advance to select the suitable sheet for printing after the size of the document is obtained instead. Compared with the prior art, which cannot judge the size of the sheet and adjust the position of the proper tray until the acquired image is processed, or needs to be adjusted manually, the invention made the relatively great progress to considerably increase the speed.

DETAILED DESCRIPTION OF THE PREFERRED EMBODIMENT OF THE INVENTION

Figure 1:
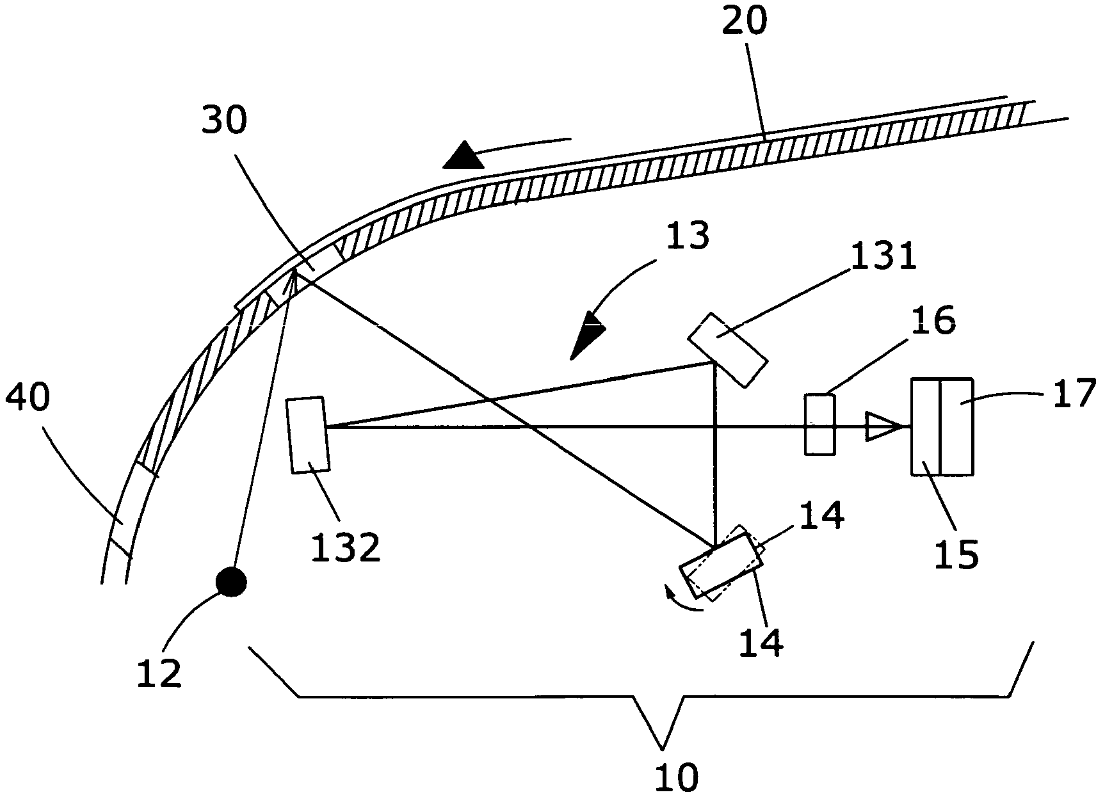
FIG. 1 is a schematic illustration showing a sheet-size detecting mechanism according to a first embodiment of the invention.
Figure 2:
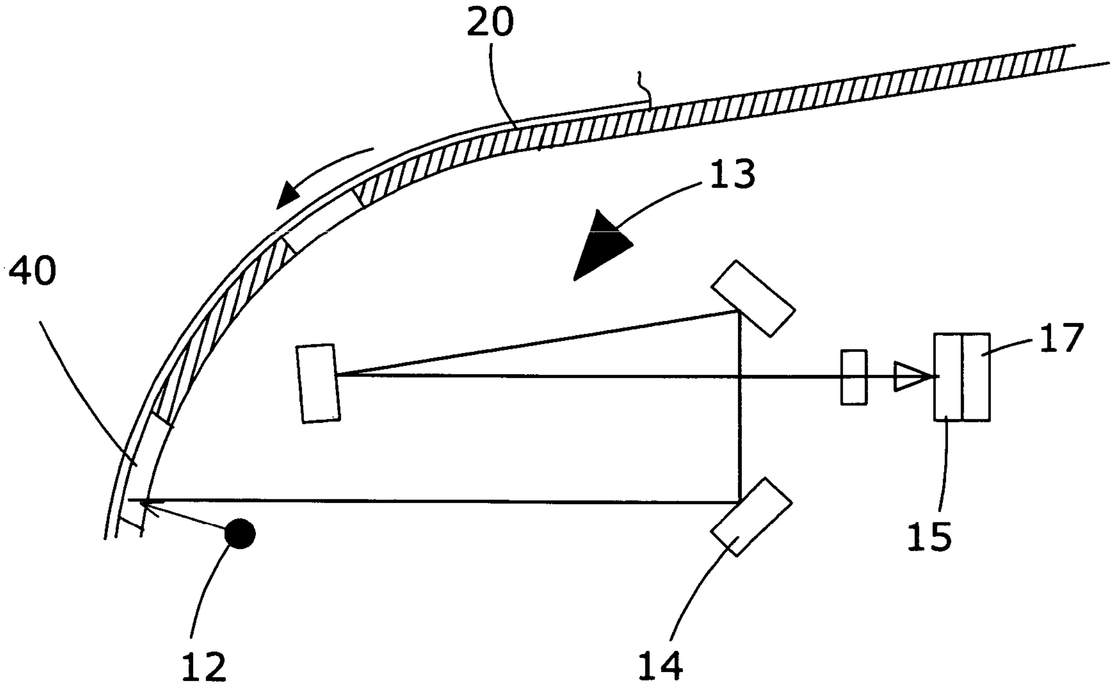
FIG. 2 is a schematic illustration showing an optical path for scanning, a sheet in the first embodiment of the invention.

Referring to FIG. 1, a sheet-size detecting mechanism 10 is disposed in an image scanning apparatus, and a sheet 20 is scanned at a scanning position 40 located on a sheet transporting path of the image scanning apparatus. The sheet-size detecting mechanism 10 includes a light source 12, a reflecting device 13, a path-routing device 14 and a photosensor 15. The sheet-size detecting mechanism 10 may further include a processing unit 17. The processing unit 17 is combined with the photosensor 15 or connected with the photosensor 15. The light source 12 is a longitudinal lamp. The reflecting device 13 is composed of at least one mirror, such as two mirrors 131 and 132, as shown in FIG. 2. The path-routing device 14 may be a mirror. The photosensor 15 is a charge coupled device (CCD) or a contact image sensor (CIS).

When the sheet 20 is automatically transported to reach a detecting position 30, the path-routing device 14 is rotated from the dashed line position to the solid line position. The light source 12 outputs light rays to illuminate the sheet 20 at the detecting position 30, the sheet 20 reflects the light rays and produces first reflected light rays, and the first reflected light rays reflected travel a first path defined by the reflecting device 13 and the path-routing device 14. Finally, the first reflected light rays pass through a lens 16 and enter the photosensor 15. Thus, the photosensor 15 receives the first reflected light rays.

The first reflected light rays may correspond to only one scan line. So, the image generated by the photosensor 15 is a line segment. The width of the sheet 20 can be obtained by calculating a length or number of pixels of the line segment.

FIG. 2 is a schematic illustration showing an optical path when the sheet 20 reaches the scanning position 40. When the sheet 20 is continuously transported to the scanning position 40, the light source 12 illuminates the sheet 20, which produces second reflected light rays. In this state, the path-routing device 14 returns to an initial state (the dashed line position of FIG. 1), and the second reflected light rays travels a second path defined by the reflecting device 13 and the path-routing device 14. Finally, the image signal generated by the photosensor 15 corresponds to the actually scanned image of the sheet 20. Thus, the first path traveled by the first reflected light rays reflected by the sheet 20 at the detecting position 30 is different from the second path traveled by the second reflected light rays reflected by the sheet 20 at the scanning position 40.

As shown in FIGS. 1 and 2, the sheet-size detecting mechanism 10 and the scanning mechanism of the image scanning apparatus may be the same mechanism. It is appreciated that the scan mechanism must include a rotatable reflecting mirror to change the optical path.

In addition, the sheet transporting path includes the detecting position 30 and the scanning position 40. The detecting position 30 is located on the sheet transporting path and in front of the scanning position 40 according to the transporting direction of the sheet 20. In other words, the sheet 20 is transported along the sheet transporting path first past the detecting position 30 and then the scanning position 40.

In this embodiment, the processing unit 17 processing a first image signal generated according to the first reflected light rays traveling the first path and using the first image signal as a reference for calculating size of the sheet 20, and for processing a second image signal generated according to the second reflected light rays traveling the second path and obtaining a scanned image of the sheet 20.

In this embodiment, the scan line width obtained by the photosensor 15 at the detecting position 30 is equal to the actual width of the sheet. In other words, the width of the sheet, which can be detected in this invention, is not particularly restricted by the standard paper layouts.

In addition, the sheet-size detecting mechanism 10 has no additional element in contact with the sheet, so the cost may be decreased, and therefore, the lifetime of the elements of the sheet-size detecting mechanism 10 will not be shortened due to the element wear.

Figure 3:
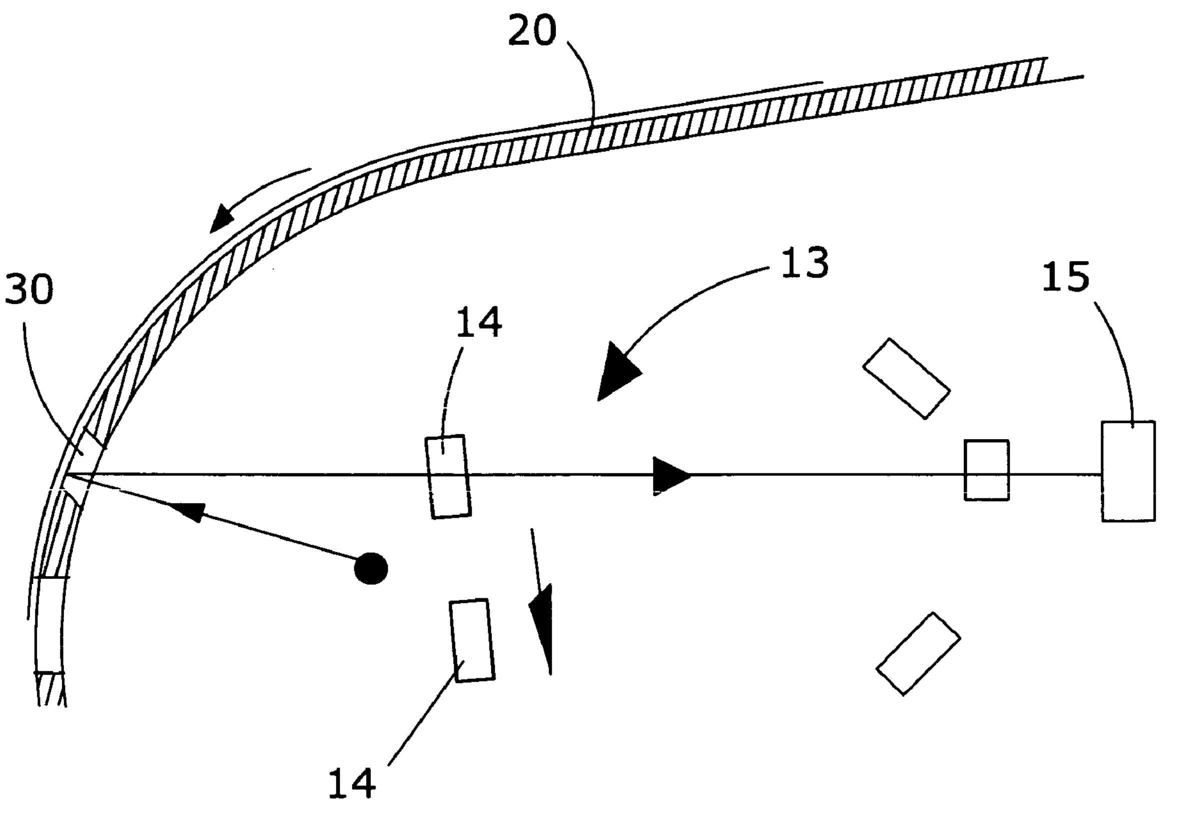
FIG. 3 is a schematic illustration showing a sheet-size detecting mechanism according to a second embodiment of the invention.

FIG. 3 is a schematic illustration showing a movable element included in the path-routing device 14. When the sheet 20 is transported to the detecting position 30, the path-routing device 14 is moved from the initial dashed line position to the solid line position. At this time, the reflected light rays from the sheet 20 at the detecting position 30 can enter the photosensor 15 without being reflected by the reflecting device 13 so that the width of the sheet 20 may be judged according to the scan signal obtained at the detecting position 30.

Figure 4:
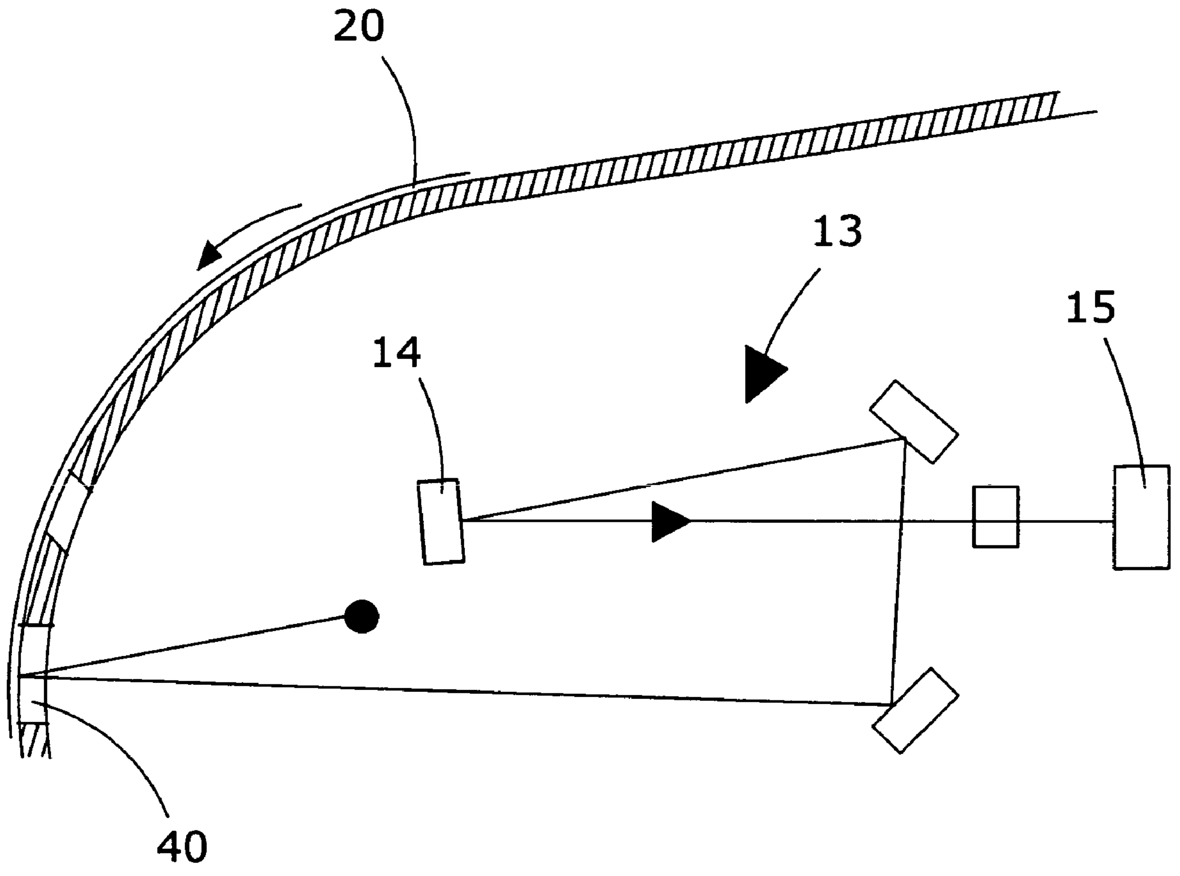
FIG. 4 is a schematic illustration showing an optical path for scanning a sheet in the second embodiment of the invention.

As shown in FIG. 4, when the sheet 20 reaches the scanning position 40, the path-routing device 14 is again moved back to the initial position, and then the scan signal travels on a path defined by the reflecting device 13 and the path-routing device 14. Finally, the photosensor 15 receives the scan signal.

The sheet-size detecting mechanism 10 and the scanning mechanism of the scan apparatus may be the same mechanism. It is appreciated that the scan mechanism must include a movable motion reflecting mirror to change the optical path.

In this and the previous embodiments, the path-routing device 14 is a dynamic path-routing device including a rotatable device or a movable device.

Figure 5:
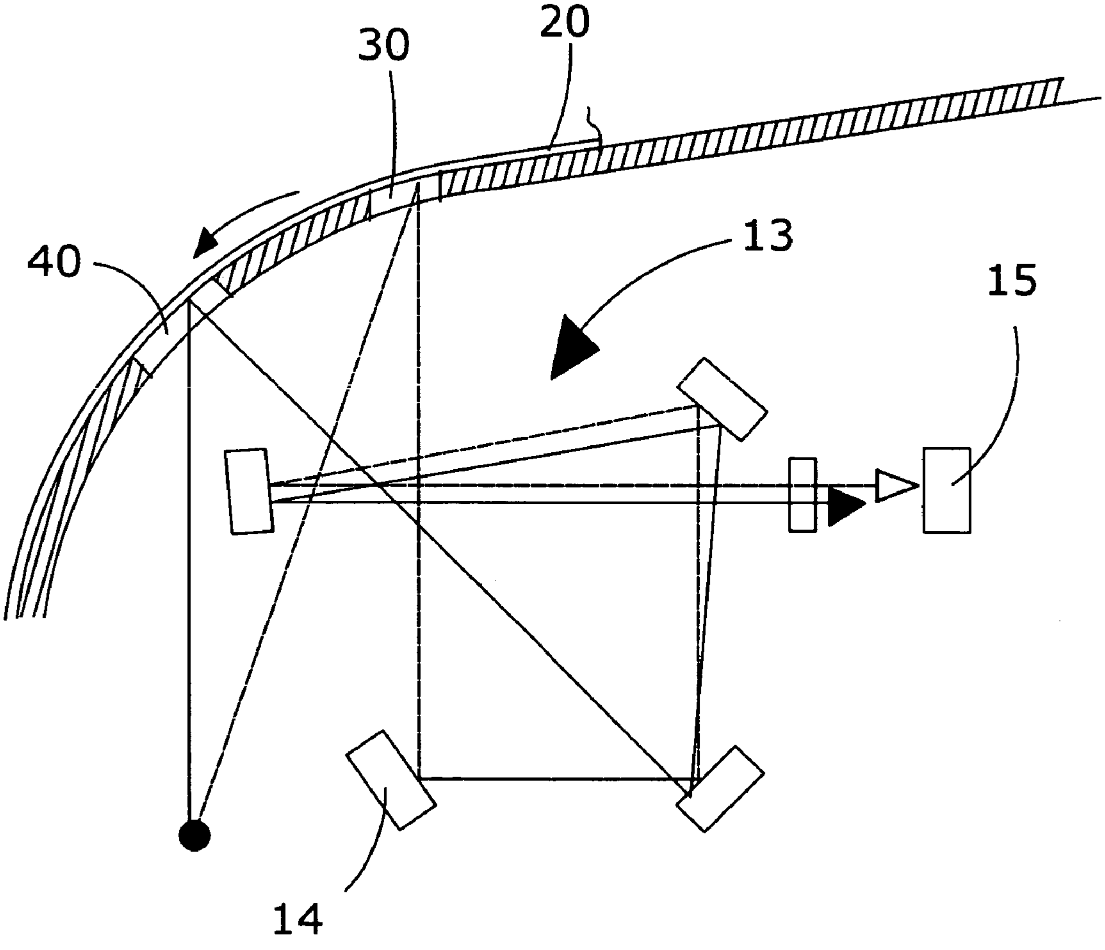
FIG. 5 is a schematic illustration showing a sheet-size detecting mechanism according to a third embodiment of the invention.

As shown in FIG. 5, the path-routing device 14 is a stationary reflecting mirror. When the sheet 20 is transported to the detecting position 30, the light rays (depicted by dashed line) reflected by the sheet 20 travel to the path-routing device 14 and the reflecting device 13 and then enter the photosensor 15 such that the width of the sheet 20 may be judged.

When the sheet 20 is transported to the scanning position 40, the light rays (depicted by the solid line) reflected by the sheet 20 travel on a path defined by the reflecting device 13 and the mirrors and finally enter the photosensor 15.

According to the above-mentioned description, the invention mainly utilizes the changes in the optical path to obtain the image of at least one scan line having the width corresponding to the width of the sheet in order to judge the actual width of the sheet before the sheet is scanned. In addition, the total track of the optical path for the sheet width detection may be unequal to the total track of the optical path for the sheet image acquiring process.

While the preferred embodiment of the present invention has been shown and described, it will be apparent to those skilled in the art that various modifications may be made in the embodiment without departing from the spirit of the present invention. Such modifications are all within the scope of the present invention.

What is claimed is:

1. A sheet-size detecting mechanism disposed in an image scanning apparatus, wherein a sheet is scanned at a scanning position located on a sheet transporting path of the image scanning apparatus, the mechanism comprising:

a detecting position located on the sheet transporting path, wherein the sheet is transported along the sheet transporting path first past the detecting position and then the scanning position;

a light source for providing light rays to illuminate the sheet at the detecting position and the scanning position;

a photosensor for receiving reflected light rays reflected by the sheet at the detecting position and the scanning position;

a path-routing device for directing the reflected light rays to the photosensor, wherein the reflected light ray reflected by the sheet at the detecting position travels a first path different from a second path which the reflected light ray reflected by the sheet at the scanning position travels; and a processing unit for processing a first image signal generated according to the reflected light ray traveling the first path and using the first image signal as a reference for calculating size of the sheet, and for processing a second image signal generated according to the reflected light ray traveling the second path and obtaining a scanned image of the sheet.

2. The mechanism according to claim 1, wherein the path-routing device is a dynamic path-routing device.

3. The mechanism according to claim 2, wherein the dynamic path-routing device comprises a rotatable reflecting mirror.

4. The mechanism according to claim 2, wherein the dynamic path-routing creating device comprises a movable reflecting mirror.

5. The mechanism according to claim 1, wherein the path-routing device is a stationary path-routing device.

6. The mechanism according to claim 5, wherein the stationary path-routing device comprises a fixed reflecting mirror.

7. An image scanning apparatus, comprising:

a sheet transporting path, providing a detecting position and a scanning position, wherein a sheet is transported along the sheet transporting path first past the detecting position and then the scanning position;

a light source for providing light rays to illuminate the sheet at the detecting position and the scanning position;

a photosensor for receiving reflected light rays reflected by the sheet at the detecting position and the scanning position;

a path-routing device for directing the reflected light rays to the photosensor, wherein the reflected light ray reflected by the sheet at the detecting position travels a first path different from a second path which the reflected light ray reflected by the sheet at the scanning position travels; and a processing unit for processing a first image signal generated according to the reflected light ray traveling the first path and using the first image signal as a reference for calculating size of the sheet, and for processing a second image signal generated according to the reflected light ray traveling the second path and obtaining a scanned image of the sheet.

8. The apparatus according to claim 7, wherein the path-routing device is a dynamic path-routing device.

9. The apparatus according to claim 8, wherein the dynamic path-routing device comprises a rotatable reflecting mirror.

10. The apparatus according to claim 8, wherein the dynamic path-routing creating device comprises a movable reflecting mirror.

11. The apparatus according to claim 7, wherein the path-routing device is a stationary path-routing device.

12. The apparatus according to claim 11, wherein the stationary path-routing device comprises a fixed reflecting mirror.

* * * * *